US008797603B1

(12) United States Patent
Dougherty et al.

(10) Patent No.: US 8,797,603 B1
(45) Date of Patent: Aug. 5, 2014

(54) METHOD AND SYSTEM FOR DOCUMENT VERSION MANAGEMENT

(75) Inventors: Paul D. Dougherty, Old Hickory, TN (US); Kevin Huffman, Hermitage, TN (US); T. Philip Lutz, II, Mt. Juliet, TN (US)

(73) Assignee: Montcastle Development, LLC, Old Hickory, TN (US)

( * ) Notice: Subject to any disclaimer, the term of this patent is extended or adjusted under 35 U.S.C. 154(b) by 100 days.

(21) Appl. No.: 13/470,622

(22) Filed: May 14, 2012

Related U.S. Application Data (60) Provisional application No. 61/485,598, filed on May 12, 2011.

(51) Int. Cl.
H04N 1/40 (2006.01)
(52) U.S. Cl.
USPC .......................................... 358/3.28; 358/1.15
(58) Field of Classification Search
USPC ............... 358/1.9, 2.1, 3.28, 1.15–1.16, 1.18, 358/402, 400, 500, 524, 426.12, 434–436
See application file for complete search history.

(56) References Cited

U.S. PATENT DOCUMENTS 6,522,770 B1 * 2/2003 Seder et al. .................... 382/100
7,075,676 B2 * 7/2006 Owen ........................... 358/1.18
8,296,832 B2 * 10/2012 Atwood et al. .................... 726/7
2011/0072272 A1 * 3/2011 Corbin et al. .................. 713/176
2012/0263343 A1 * 10/2012 Simske et al. ................. 382/100

OTHER PUBLICATIONS http://reprographics.blogspot.com/2011/11/arkitektkopias-byggnet-verify-app-is.html.
http://www.byggnet.se/byggnet-verify.aspx (Jul. 30, 2012).

* cited by examiner

Primary Examiner — Thomas D Lee
Assistant Examiner — Stephen M Brinich
(74) Attorney, Agent, or Firm — Waddey Patterson; Mark J. Patterson (57) ABSTRACT

A method of managing construction documents used on different on construction project sites includes storing digital copies of current and historical versions of the construction documents in a central document management server. A unique document version identifier and regulatory jurisdiction identifier is stored. When a paper document is printed, a matrix barcode is generated, encoded with the document version identifier, and printed on the paper document. The barcode is scanned at the project site. The central document server compares the document version identifier and regulatory jurisdiction identifier decoded from the matrix barcode to the identifiers stored in the central document server. The central document server then automatically communicates the result of the comparisons to a user of the printed document.

20 Claims, 5 Drawing Sheets

METHOD AND SYSTEM FOR DOCUMENT VERSION MANAGEMENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: U.S. Provisional Patent Application No. 61/485,598, filed May 12, 2011, for "Information System to Provide Remote Notification of the Current Version of a Printed Material."

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to managing different versions of documents. More particularly, the present invention pertains to methods and systems for maintaining revision control of electronic and printed documents.

Conventional documents do not inform the reader or user if the document is the most current version. For example, documents used on a construction project site may have been revised by the project architect or engineer working remotely from the job site. If construction drawings used on the job-site are not the most current versions, this may be unknown to the workers in the field. Consequently, changes made to the drawings may not be reflected in the actual construction, causing expensive errors and delays. Also, the use and content of design and construction documents may be governed by regulatory agencies or laws in different jurisdictions. Using documents for regulatory compliance in the wrong jurisdiction may produce errors.

Conventional methods used to minimize document-version errors in the field typically involve manually checking the documents in the field against a document manifest. This manual checking process is slow, expensive, and error-prone.

BRIEF SUMMARY OF THE INVENTION

In one aspect, the present invention is a method of managing document version information associated with documents maintained and used in paper and digital form. In an embodiment, the method includes storing in a digital document management database a digital document file representing the document and also storing document version information linked to the digital document file. The document is printed as a paper document using the digital document file. When the paper document is printed, a document version image which has been encoded with at least some of the stored document version information is printed on the document. In one embodiment, the encoded document version image is a matrix barcode.

In another aspect, the method of managing document version information includes using an electronic image capture device, such as a cellular telephone or other wireless device having a camera, to scan and capture the document version image printed on the paper document. Using an image processor in the wireless device and/or in a central document server, the document version information is then decoded from the scanned document version image. Using a document version management processor, the decoded document version information is compared to the stored document version information associated with the document. The stored and encoded document version information can include a current document revision identifier and the document version information encoded in the document version image will include an encoded document revision identifier.

In a further aspect, the method includes automatically transmitting a revision mismatch signal to the user's cellular telephone or other user communications device if the encoded document revision identifier decoded from the scanned document version image does not match the stored current document revision identifier.

In yet another aspect, the method of managing document version information includes storing jurisdictional data defining a jurisdictional region corresponding to a document regulatory authority associated with the document. The user's cell phone or other image capture device can include a global positioning system (GPS) receiver that detects and generates current document location coordinates defining the location where the document is scanned. The current document location coordinates are communicated to the document version management processor and then compared to the stored jurisdictional data associated with the document. A jurisdiction mismatch signal is then sent to the user's cell phone or other communications device if the current document location coordinates define a document location that is outside the jurisdictional region associated with the document.

The version and jurisdiction mismatch signals can be sent to the user's communications device as a text message, email message, voice message, or a combination thereof. In response to receiving the mismatch signal, the user's communications device can generate a visual or audible alert to the user.

In another aspect, the digital document management processor is associated with a network address, such as a unique system Uniform Resource Locator (URL) which is also encoded on the document version image. The method can then include encoding the document version image with the URL and decoding the system URL from the scanned document version image so that the document version information can be directed to the proper network address.

In another embodiment, the present invention is a document management system in which a document management database is functionally coupled to the document management server. The document management server includes a document management processor and database management software to store digital document files representing documents to be managed. The document management processor and database management software store document version information for each of the digital document files, generate document version images for each of the digital document files, and encode the document version images with at least some of the document version information.

The system may include a document printer that is functionally coupled to the document management server so that the printer can print paper documents represented by the digital document files and print the encoded document version images on the printed paper documents. The document management server is coupled to a data communications network. The system may include a user communications device configured to receive data from the data communications network. In some embodiments, the user communications device is a cellular telephone that includes a camera or other electronic image capture device to capture document version images printed on the paper documents. The user communications device is also functional to transmit the captured document version images to the document management server via the data communications network.

In a further aspect, the document management server receives at least some of the document version information decoded from the document version images transmitted by the image capture device and compares at least some of the decoded document version information to the respective stored document version information associated with the document. The document management server automatically generates and transmits a mismatch signal via the communications network to the user communications device if at least some of the decoded document version information for a respective one of the documents does not match the stored current document revision information stored for that document. In some embodiments, the stored document version information includes a current document revision identifier and the encoded document version information includes an encoded document revision identifier so that the document management server automatically transmits the mismatch signal if the decoded document revision identifier for a respective one of the documents does not match the current document revision identifier stored for that document.

In some embodiments of the system, the document version information stored in the document management database further includes jurisdictional data defining a jurisdictional region corresponding to a document regulatory authority associated with each of the documents. The user communications device further includes a global positioning system (GPS) receiver that detects and generates current document location coordinates defining the locations where the documents are scanned. The user communications device transmits the current document location coordinates to the document management server via the data communications network. In this aspect, the document management server receives the current document location coordinates, compares the current document location coordinates to the stored jurisdictional data associated with the documents, and automatically transmits the mismatch signal if the current document location coordinates received for a respective one of the documents define a location that is outside the jurisdictional region associated with that document.

In some embodiments, the image capture device and the user communications device are integral to a portable wireless communications device, such as user cellular telephone configured to receive voice and text messages directed to a user cellular telephone number. The image capture device may be a camera embedded in the user cellular telephone. In some embodiments, the data communications network is a cellular communications network. The mismatch signals may be text messages, voice messages, and/or email messages directed to the user cellular telephone. In a further aspect, the user cellular telephone will generate a visual alert or an audible alert in response to receiving the mismatch signals.

A particular embodiment of the invention is a method of managing construction documents used on different on construction project sites. The method includes storing digital copies of current and historical versions of the construction documents in a central document management server. A unique document version identifier for each historical and current version of each document is also assigned and stored. The central document server also stores a regulatory jurisdiction identifier for each document and contact information for a notification person for each document. The central document server is connected to a data network so that the document management server can be accessed at a server access address.

In this embodiment, the method includes printing one or more of the documents as a paper document for use at a construction project site. When the paper document is printed, a matrix barcode is generated, encoded with the document version identifier, and printed on the paper document. The central document server receives via the data network the document version identifier decoded from a matrix barcode printed on a paper document at one of the project sites. The central document server compares the received document version identifier decoded from the matrix barcode to the document version identifier stored in the central document server that corresponds to the current version of the document. The central document server then automatically communicates via an alert network a result of the version comparison step to a user of the printed document.

The method of this embodiment further includes storing in the central document server a regulatory jurisdiction location for each document. The central document server receives, via either the data network or the alert, network location data representing a geographic location of the project site where the paper document is located. The central document server compares the geographic location of the project site for the scanned matrix car code to the regulatory jurisdiction location stored for the document and automatically communicates the result via the alert network to a user of the printed document.

In one embodiment of this particular method, the data network and alert network are cellular networks. In this embodiment, the method further includes scanning the matrix barcode on the printed document at the project site using a portable wireless device coupled to the cellular network. The location data received by the central document server is generated from a Global Positioning Receiver located in the portable wireless device and the results of the version comparison and jurisdiction verification steps are communicated to the portable wireless device.

DETAILED DESCRIPTION OF THE INVENTION

Figure 4:
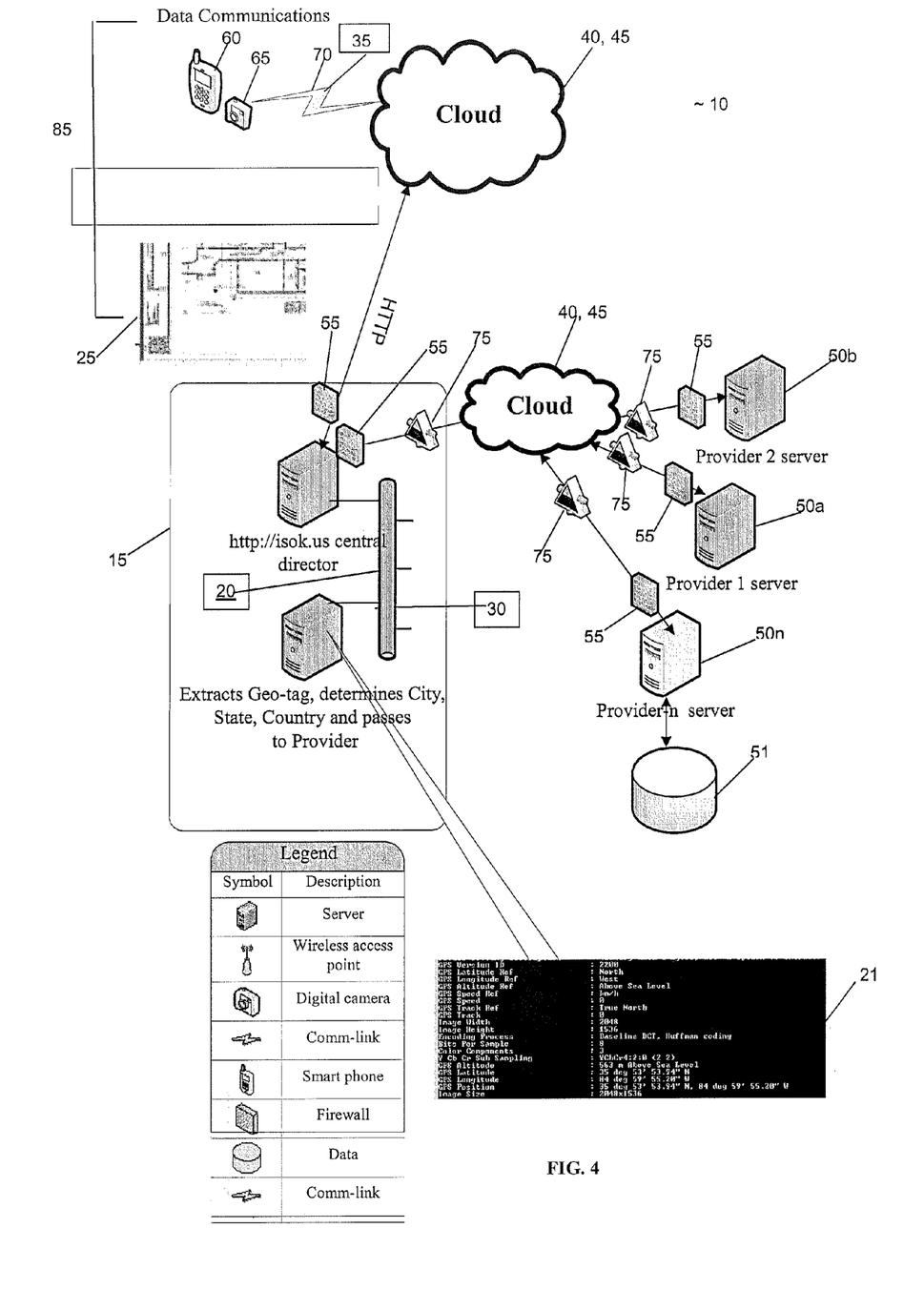
FIG. 4 is a block diagram of an embodiment of a document version control system according to the present invention.

One embodiment of document management system in accordance with the present invention is shown in FIG. 4. The system 10 includes a central document management database 20 integral to or functionally coupled to a central document management server 15. The central document management server may include a document management processor and database management software to store digital document files representing one or more documents to be managed. In a particular embodiment, the documents to be managed include construction documents 25 that are used by workers on a construction project site 85 to construct a building or other structure. The central document management server 15, and particularly the processor and database management software, store digital document files representing each document 25 and document version information linked to each of the digital document files. The document version information may include a document name, sheet number, document owner, document set, creation date, document revision identifier, project identifier, and jurisdiction of use. The document version information may also be referred to as document metadata.

In one embodiment, the documents stored on the central document management server 15 may be owned by one or more document providers, such as a construction company, building owner, or design professional. These providers may operate their own provider document management servers 50a, 50b, . . . 50n, each including a provider document database 51. The central document management server 15 may be coupled to the provider document management servers 50a . . . n by a data communications network 40, through a firewall 55 and communications interface 75. In one embodiment, the data communications network 40 can be a public cloud network defined on the Internet. In this embodiment of system 10, the provider document management servers 50a . . . n can send and receive digital document files and document version information for documents 25 owned by a respective provider. Accordingly, in this respect the tasks or steps described herein as being performed by the central document management server 15 can include or incorporate tasks that are cooperatively performed by a provider document management server 50.

According to one aspect of the present invention, the central document management server 15 includes software capable of generating a document version image for each of the digital document files. The document version image is merged into a stored digital document file at a position on the printed document determined by the document owner, usually in the title block. The document version image may be stored electronically with the digital document file or applied only when a paper document is printed.

Figure 5:
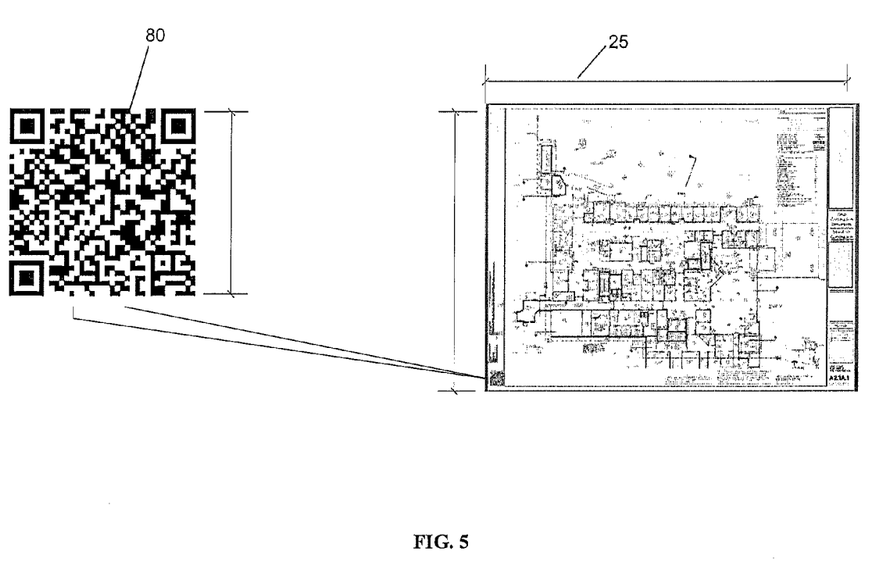
FIG. 5 illustrates the placement of a unique document QR Code on a document, in accordance with one aspect of the present invention.

In one embodiment, the document version image can be a matrix barcode, also known as a two-dimensional or 2D barcode. In a particular embodiment as shown in FIG. 5, the matrix barcode may be a QR code 80. The central document management server encodes the document version image 80 with at least some of the document version information. As is known to those of skill in the art, a QR code (or "quick response code") is a particular type of barcode that is detected as a two-dimensional digital image by an electronic image sensor. The captured image is then digitally analyzed by an image processor that is programmed to process QR codes and to decode the information encoded therein. The image processor locates three distinctive squares that are defined at the corners of the image. The image processor further normalizes image size, orientation, and angle of viewing. The small dots in the image are then converted to binary numbers representing the encoded information. The decoded data may be checked with a conventional error-correcting algorithm or code.

Still referring to FIG. 4, the system 10 may include a central document printer 30 and/or a site document printer 35. The printers 30, 35 are coupled to the central document management server 15, either directly or via the network 40, so that the printers 30, 35 can print paper documents 25 represented by the digital document files and further print the encoded document version images 80 on the printed paper documents 25.

The system 10 may include a user communications device configured to receive data from the data communications network. In the embodiment of FIG. 4, the user communications device may be a cellular telephone 60 that includes (or is connected to) a camera 65 or other electronic image capture device to capture document version images 80 printed on paper documents 25. In other embodiments, the user communications device may be a tablet device, a document scanner, a stand-alone camera 65, or any other conventional device that is capable of directly or indirectly transmitting captured document version images 80 (or information decoded therefrom) to the central document management server 15 via the data communications network 40. Typically, the user communications device 60, and image capture device 65 are located at the construction project site 85 where the documents 25 may be scanned and or printed.

According to a further aspect of the invention, the central document management server 15 receives at least some of the document version information decoded from the document version images 80 that are captured by the image capture device associated with the user communications device 60. The document version images 80 may be processed and the document version information may be decoded using an image processor located in the user communications device, in the central document management server 15, or in both. The central document management server 15 includes conventional database software that compares at least some of the decoded document version information to the document version information that is stored in the central document management data base 20 and associated with a particular document 25.

The central document management server 15 also includes conventional software and hardware that automatically generates and transmits a mismatch signal via either the data communications network 40 or an alert network 45 to the user communications device 60. The mismatch signal is sent if at least some of the decoded document version information for a document 25 does not match the current document version information stored for that document. In some embodiments of the system 10, the stored document version information includes a current document revision identifier that signifies the most current version of the document. The encoded document version information in the document version image 80 includes an encoded document revision identifier. Accordingly, the central document management server 15 automatically transmits a mismatch signal if the decoded document revision identifier for a particular printed document 25 does not match the current document revision identifier stored for that document.

In some embodiments of the system 10, the document version information stored in the central document management database 20 further includes jurisdictional data 21 defining a geographic jurisdictional region corresponding to a document regulatory authority associated with each of the documents. For example, a construction document 25 used at a particular project site 85 must comply with requirements imposed by local or state building authorities and/or must include a stamp or signature from a design professional licensed in the jurisdiction in which the project site 85 is located. Accordingly, the user communications device 60 may further include a global positioning system (GPS) receiver that detects and generates current document location coordinates defining the location, e.g., project site 85, where a document version image 80 on a printed document 25 is scanned. The user communications device 60 transmits the current document location coordinates to the central document management server 15 via the data communications network 40. The central document management server 15 receives the current document location coordinates and, using conventional database software, compares the current document location coordinates to the jurisdictional data 21 stored in the central document management database 20 that is associated with a particular document 25. Accordingly, the central document management server 15 automatically transmits a mismatch signal on an alert network 45 if the current document location coordinates received for a document 25 define a location that is outside the jurisdictional region associated with that document.

In some embodiments, the image capture device 65 and the user communications device 60 are integral to a portable wireless communications device, such as a user cellular telephone 60 that is conventionally configured to receive voice and text messages directed to a user cellular telephone number. The image capture device may be a camera embedded in the user cellular telephone. In some embodiments, the data communications network 40 and the alert network 45 may include the same or different cellular communications networks and may be further interconnected with a public network, i.e. the Internet. The match and mismatch signals sent by the system may be text messages, voice messages, and/or email messages directed to the user cellular telephone 60. In a further aspect, the user cellular telephone 60 may generate a visual alert or an audible alert in response to receiving mismatch signals or match signals.

The central document management server 15 may also be programmed to automatically transmit a match signal on the alert network 45 if the decoded document revision identifier for a particular printed document 25 matches the current document revision identifier stored for that document and/or if current document location coordinates received for a document 25 define a location that is inside the jurisdictional region associated with that document.

The central document management server 15 may be associated with a network address, such as a unique IP address or Uniform Resource Locator (URL) which is also encoded in the document version image 80. Accordingly, the image processor in the user communications device 60 or image capture device 65 can decode the server URL from the scanned document version image 80 so that the captured document version information can be directed to the proper network address.

Figure 3:
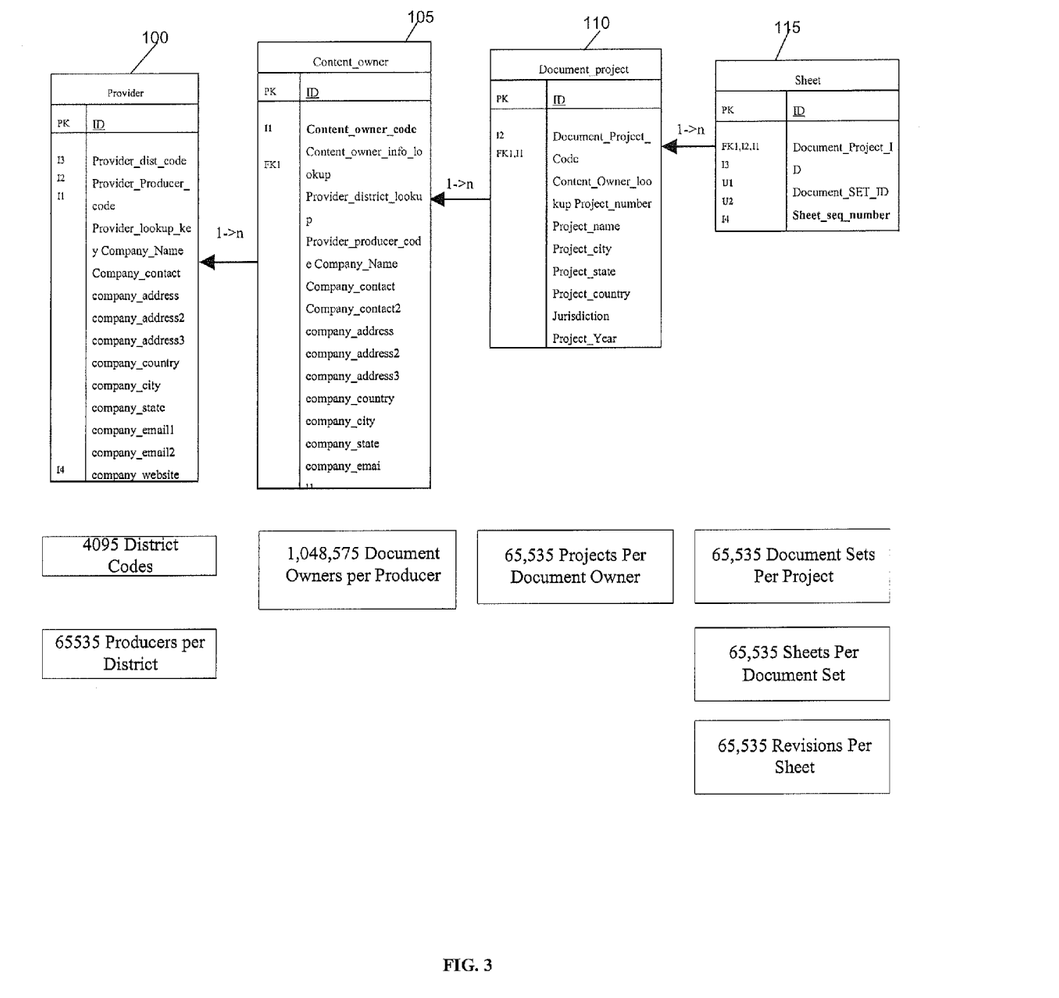
FIG. 3 illustrates an embodiment of data structures and document encoding usable for generating a matrix barcode (QR Code) that embodies information about the unique version of a document.

Referring now to the data structures and encoding in more detail, FIG. 3 defines an embodiment of the database relationships required between document version data stored in the central document management database 20 and in a provider document management database 51. In particular, FIG. 3 shows the authoritative source for different type of document version information and defines a method for the database software to determine where to direct queries for obtaining document version information about a document 25

In this embodiment, the central document management server 15 maintains a master list of district codes to which a document producer is assigned. The producers may be geographically dispersed throughout the world and can be grouped by district to facilitate network traffic. In an embodiment, there can be up to 4095 districts and 65,535 producers per district, enabling a total number of 268,365,825 document providers. Each producer can store and maintain documents for 1,048,575 document owners. Each document owner can have up to 65,535 projects, with 65,535 document sets consisting of up to 65,535 sheets in each set and up to 65,535 versions of each sheet. In other embodiments a different breakdown may be more useful.

Based on the index of each of these districts, producers, providers, projects, document sets, sheets and versions, a unique document identifier (UID) may be constructed and encoded into a base-36 ASCII string. This UID may be appended to the URL associated with the central document management server 15*e*. This encoding may be desired to keep the document version image to a reasonable size and to allow for highest level of error correction in the code.

In the embodiment of FIG. 3, the central document management server 15 is the authoritative source of the Provider ID (data structure 100), the Document (Content) Owner ID (data structure 105), the Project ID (data structure 110) and the sheet ID (data structure 115.) The authoritative source of the content of the other data fields in the data structures 100, 105, 110, and 115 is the provider that generally prints the documents. Accordingly, the document version data fields illustrated in the embodiment of FIG. 3 define a thirty-one character HEX string that is encoded along with the central document management server URL into a base-36 text string. In one particular embodiment, this text string is used to generate a Version 4 QR code with Level H error correction which may be needed for field conditions a project site 85.

Referring to the particular data fields used in the embodiment of FIG. 3, one example of a HEX text string representing document version information for a particular document is:
    provider_country_code=fff 4095
    provider_producer=0fff 4095
    document_content_owner=fffff 1048575
    document_Content_year=fff 4095
    document_Content_project_num=ffff 65535
    document_Content_set_id=ffff 65535
    document_Content_seq_num=ffff 65535
    document_Content_rev_num=ffff 65535
    This HEX string is encoded into base-36 as "Y3C95YLI9YSCY1L668OCTLVJ" and is appended to the URL "HTTP://ISOK.US?" as "HTTP://ISOK.US?Y3C95YLI9YSCY1L668OCTLVJ". Uppercase text may be used because the QR code can be more compact.

In some embodiments, the central document management server 15 includes conventional software applications that decode the document version information. The central document management server 15 maintains a list of all producers and their respective network (e.g. internet website) addresses that can be accessed from the network 40. Based on the information decoded from the document version information, the central document management server 15 determines the identity of the producer and transmits the unique document identifier (UID) that is encoded into the document version image. The producer can query its own document management server 50 to determine if this UID represents the latest version of the document.

In one embodiment, the central document management server 15 determines the city, county, state or province, and country in which the document location coordinates are positioned and sends this information to the corresponding provider. The provider document management server 50 queries its database 51 to determine if the document is assigned to that location.

The provider document management server 50 transmits to the central document management server 15 the current version and the jurisdiction for the document 25; the name, phone number and email address of the contact person or notification person responsible for management of the document, and a URL that can be used to download the most current version of the document.

If the document is not the latest version and the GPS coordinates are inside the jurisdiction, the user is notified by a mismatch signal that the version is not valid and, by a match signal, that the jurisdiction is correct. The user may be given the option to call or email the responsible person or to download the correct version. At this point, the transaction ends.

If the document is not the latest version and the GPS coordinates are not inside the jurisdiction, the user is notified that the version is not valid and warned that the document scan did not occur in the proper. The user may be given the option to call or email the responsible person or to download the correct version. The transaction ends.

If the document is not the latest version and GPS coordinates were not sent, the user is notified that the version is not valid and that coordinates were not received from user communication device. The user may be given the option to call or email the responsible person or to download the correct version. The transaction ends.

The present invention also includes a method of managing document version information associated with a document. In an embodiment shown in FIGS. 1 and 2, the method in a step 200 includes storing in a digital document management database a digital document file representing a document. In a step 210, the method also includes storing in the digital document management database document version information linked to the digital document file. The document version information may include a unique document identifier (UID) for each revision of a document in a document set, a regulatory jurisdiction applicable to the document, and contact information (e.g., email address and cellular phone number) for a person to be notified about the version status of a document.

Figure 1:
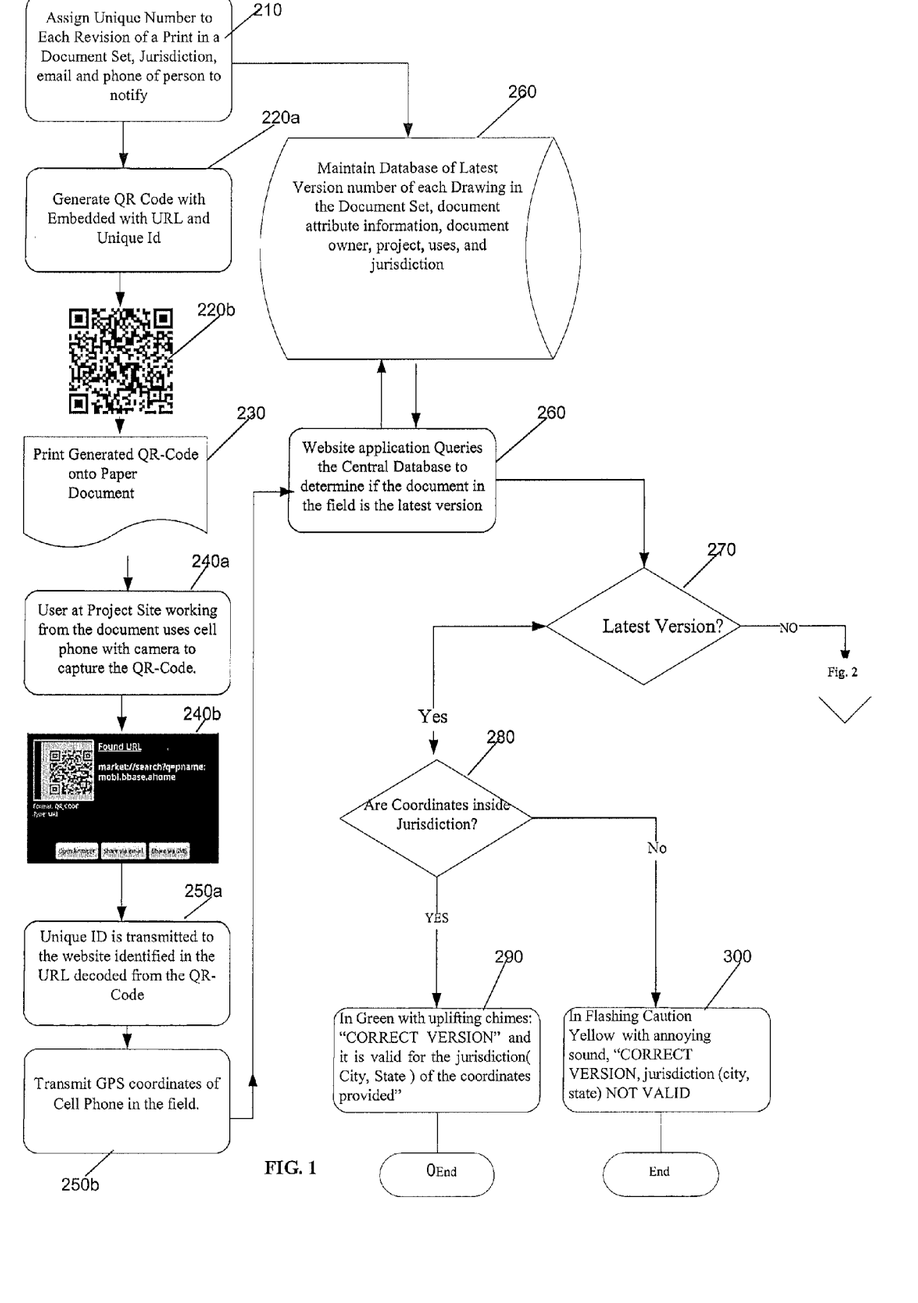
FIG. 1 and FIG. 2 are flow charts that collectively illustrate embodiments of a document version control method according to the present invention.
Figure 2:
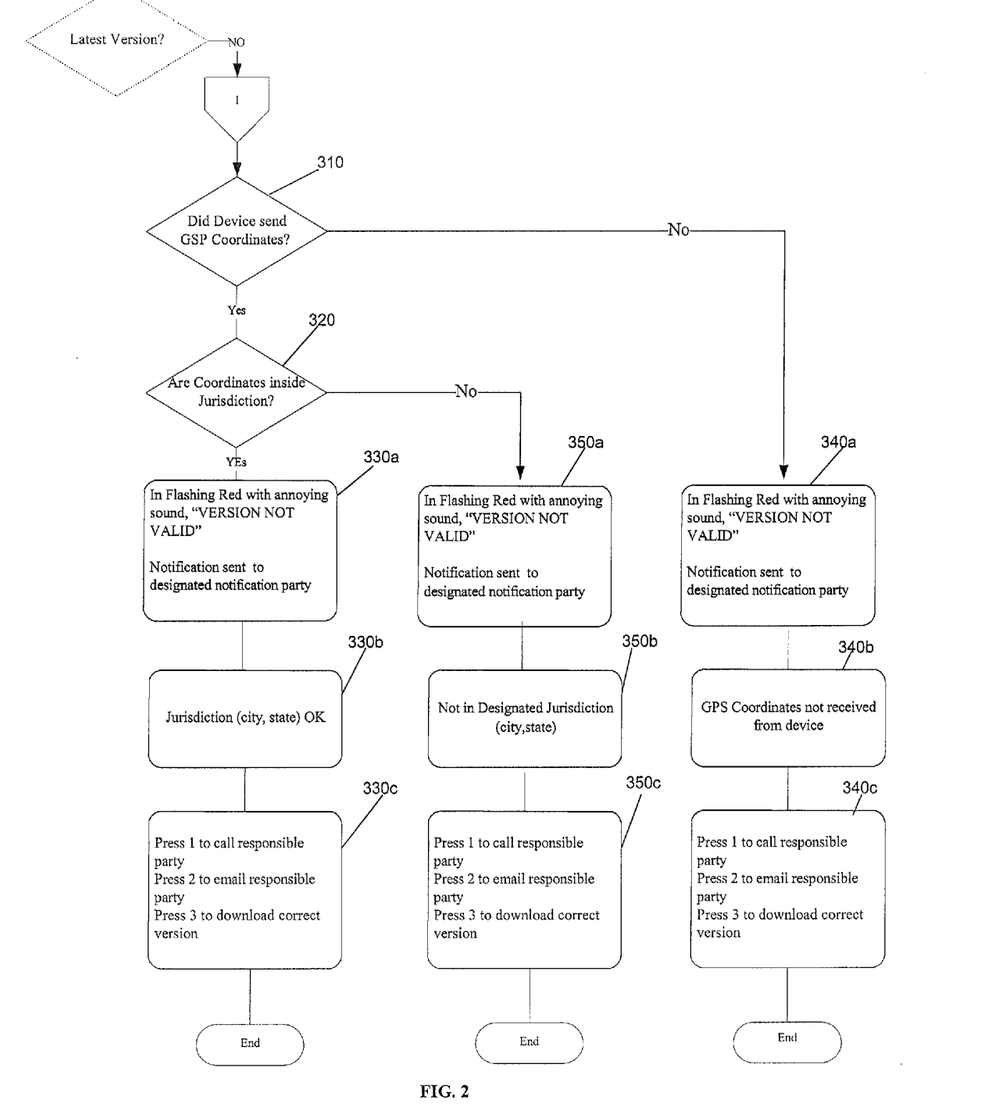

In steps 220a and 220b, a document version image (e.g., QR code) is generated and encoded with the document UID and a network address (e.g., a URL) linked to the digital document management database. In step 230, a document is printed as a paper document using the digital document file, including printing the encoded document version image on the paper document.

In steps 240a and 240b, a user in the field, such as a worker at a construction project site, uses an electronic image capture device such as a cell phone camera to scan the document version image printed on the paper document. The document version information and encoded URL is then decoded from the captured document version image.

In step 250a, the document version information (e.g., the document UID) decoded from the scanned document version image is transmitted to the central document server. In version comparison step 260, using a computerized document management processor that is functionally coupled to the digital document management database, the document version information decoded from the scanned document version image is compared to the stored document version information associated with the document. In a particular embodiment of step 250a, the stored document version information or UID includes a current document revision identifier. The document version information encoded in the document version image includes an encoded document revision identifier, so that the version comparison step includes comparing the encoded document revision identifier decoded from the scanned document version image to the stored current document revision identifier.

The method may further include storing jurisdictional data defining a jurisdictional region corresponding to a document regulatory authority associated with the document. The image capture device may include a global positioning system (GPS) receiver that detects and generates current document location coordinates defining the location where the document is scanned. If, according to step 270, the decoded and stored document revision identifiers match (as encoded, for example, in the document UID), the method may include, in a step 280, using a document version management processor to compare the current document location coordinates to the stored jurisdictional data associated with the document.

If, according to step 270, the stored and decoded document revision identifiers match, and optionally if in addition the jurisdictions match, the method may include a step 290 in which a "correct version" match signal is automatically transmitted to the user at the project site using the notification user contact information stored in step 210.

If the stored and decoded document revision identifiers match, but the stored and scanned jurisdictions do not match, a "not valid" mismatch signal may be sent in step 300 to the document user.

If in step 270, the stored and decoded document revision identifiers do not match, a "not valid" mismatch signal may be sent to the user. Optionally, if the document revisions identifiers do not match, the method may include in steps 310 and 320 determining if the stored and scanned jurisdictional locations match. If the locations match, a "version not valid" mismatch signal may be sent to the user in step 330a along with a "jurisdiction OK" match signal in step 330b. In step 330c, the user may then be prompted to call or email the document owner/provider or to download the current revision version of the document.

If according to step 310, current jurisdictional information (e.g., GPS coordinates) is not received, a "version not valid" mismatch signal may be sent to the user in step 340a along with a "GPS coordinates not received" mismatch signal in step 340b. In step 340c, the user may then be prompted to call or email the document owner/provider or to download the correct version of the document.

If according to steps 310 and 320, the current and stored jurisdictional locations match, a "version not valid" mismatch signal may be sent to the user in step 350a along with a jurisdiction mismatch signal in step 350b. In step 350c, the user may then be prompted to call or email the document owner/provider or to download the correct version of the document.

In various embodiments, the image capture device and the user communications device can be integral to a portable wireless communications device, such as a user cellular telephone configured to receive voice and text messages. In these embodiments, the document version information stored in the digital document management database can include at least one electronic communications address for the user, such as an email address or cellular telephone number. In these embodiments, the steps of automatically transmitting the revision and jurisdiction mismatch signals to the user may include sending an email message, voice message or text message to the electronic communications address for the user.

In some embodiments of the method, the user cellular telephone includes a camera that can scan and capture the document version image. In even further embodiments, the method may include automatically generating in the user communications device a visual or audible alert in response to receiving a revision mismatch or a jurisdiction mismatch signal.

A particular embodiment of the invention is a method of managing construction documents used on different on construction project sites. The method includes storing digital copies of current and historical versions of the construction documents in a central document management server. A unique document version identifier for each historical and current version of each document is assigned and stored. The central document server also stores a regulatory jurisdiction identifier for each document and contact information for a notification person for each document. The central document server is connected to a data network so that the document management server can be accessed at a server access address.

In this embodiment, the method includes printing one or more of the documents as a paper document for use at a construction project site. When the paper document is printed, a matrix barcode is generated, encoded with the document version identifier, and printed on the paper document. The central document server receives via the data network the document version identifier decoded from a matrix barcode printed on a paper document at one of the project sites. The central document server compares the received document version identifier decoded from the matrix barcode to the document version identifier stored in the central document server that corresponds to the current version of the document. The central document server then automatically communicates via an alert network a result of the version comparison step to a user of the printed document.

The method of this embodiment further includes storing in the central document server a regulatory jurisdiction location for each document. The central document server receives, via either the data network or the alert network, location data representing a geographic location of the project site where the paper document is located. The central document server compares the geographic location of the project site for the scanned matrix barcode to the regulatory jurisdiction location stored for the document and automatically communicates the result via the alert network to a user of the printed document.

In one embodiment of this particular method, the data network and alert network are a cellular network. In this embodiment, the method further includes scanning the matrix barcode on the printed document at the project site using a portable wireless device coupled to the cellular network. The location data received by the central document server is generated from a Global Positioning Receiver located in the portable wireless device. The results of the version comparison and jurisdiction verification steps are automatically communicated to the portable wireless device.

The advantages of the present invention include, without limitation, that users of documents from a multitude of providers have a way to determine if the document is the latest version. Further, the user can determine if the document is in a location jurisdiction for which it is intended. Further, the user can be given instructions based on the jurisdiction or the version of the document.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

Thus, although there have been described particular embodiments of the present invention of a new and useful Method and System for Document Version Management, it is not intended that such references be construed as limitations upon the scope of this invention except as set forth in the following claims.

What is claimed is:

1. A method of managing document version information associated with a document, the method comprising:
   storing in a digital document management database a digital document file representing a document;
   storing in the digital document management database document version information linked to the digital document file;
   printing the document as a paper document using the digital document file,
   wherein the step of printing the paper document further comprises
      generating a document version image for the document being printed, the document version image comprising a barcode,
      encoding the document version image with at least some of the stored document version information associated with the document being printed, and
      printing the encoded document version image on the paper document;
   using an electronic image capture device, scanning the document version image printed on the paper document;
   decoding at least some of the document version information from the scanned document version image; and
   in a version comparison step, using a computerized document management processor functionally coupled to the digital document management database, comparing at least some of the document version information decoded from the scanned document version image to the stored document version information associated with the document.

2. The method of claim 1 wherein:
   the stored document version information comprises a current document revision identifier and the document version information encoded in the document version image comprises an encoded document revision identifier;
   the version comparison step further comprises comparing the encoded document revision identifier decoded from the scanned document version image to the stored current document revision identifier; and
   the method further comprises automatically transmitting a revision mismatch signal to a user communications device if the encoded document revision identifier decoded from the scanned document version image does not match the stored current document revision identifier.

3. The method of claim 2 wherein:
   the stored document version information further comprises jurisdictional data defining a jurisdictional region corresponding to a document regulatory authority associated with the document;
   the image capture device comprises a global positioning system (GPS) receiver functional to detect and generate current document location coordinates defining the location where the document is scanned; and
   the method further comprises
      receiving the current document location coordinates at the document version management processor,
      using the document version management processor, comparing the current document location coordinates to the stored jurisdictional data associated with the document, and automatically transmitting a jurisdiction mismatch signal to the user communications device if the current document location coordinates define a document location that is outside the jurisdictional region associated with the document.

4. The method of claim 3 wherein the image capture device and the user communications device are integral to a portable wireless communications device.

5. The method of claim 4 wherein:
the document version information stored in the digital document management database further comprises at least one electronic communications address for the user; and
the steps of automatically transmitting the revision and jurisdiction mismatch signals to the user each comprise sending an electronic message to the electronic communications address for the user.

6. The method of claim 5 wherein:
the electronic communications address for the user comprises a user cellular telephone number;
the portable wireless communications device is a user cellular telephone configured to receive voice and text messages directed to the user cellular telephone number, the user cellular telephone further comprising a camera effective to scan and capture the document version image;
the document version management processor is functionally coupled to a central wireless communications device configured to send at least one of a text message and a voice message; and
the steps of automatically transmitting revision and jurisdiction mismatch signals to the user comprise sending at least one of a text message and a voice message from the central wireless communications device to the user cellular telephone.

7. The method of claim 5 wherein:
the electronic communications address for the user comprises an email address;
the portable wireless communications device is a user cellular telephone configured to receive email messages directed to a user email address, the user cellular telephone further comprising a camera effective to capture the document version image;
the document version management processor is functionally coupled to an email server configured to send email messages; and
the steps of automatically transmitting revision and jurisdiction mismatch signals to the user comprises sending an email message from the email server to the user email address.

8. The method of claim 3 further comprising;
automatically generating in the user communications device at least one of a visual or audible alert in response to receiving each of a revision mismatch and a jurisdiction mismatch signal.

9. The method of claim 2 wherein:
the step of storing a digital document file in the digital document management database further comprises storing current and historical revisions of the document; and
the method further comprises
associating an historical revision identifier with each stored historical revision of the document, and
storing the historical revision identifiers in the digital document management database.

10. The method of claim 1 wherein:
the digital document management processor is associated with a unique system Uniform Resource Locator (URL) and is effective to receive data directed to the system URL; and
the method further comprises
encoding the system URL in the document version image,
decoding the system URL from the scanned document version image, and
in the version comparison step, sending the document version information decoded from the scanned document version image to the digital document management processor using the system URL decoded from the scanned document version image.

11. The method of claim 10 wherein the document version image is a matrix barcode.

12. A document management system comprising:
a data communications network;
a document management server functionally coupled to the data communications network;
a document management database functionally coupled to the document management server;
the document management server comprising a document management processor and database management software functional to store digital document files representing documents to be managed in the document management database;
the document management processor and database management software are further functional to
store document version information for each of the digital document files,
generate document version images for each of the digital document files, each of the document version images comprising a bar code, and
encode the document version images with at least some of the document version information;
a document printer functionally coupled to the document management server and effective to
print paper documents represented by the digital document files, and
print the encoded document version images on the printed paper documents;
a user communications device configured to receive data from the data communications network;
an electronic image capture device functional to
capture the document version images printed on the paper documents, and
transmit the captured document version images to the document management server via the data communications network;
the document management server is further functional to
receive at least some of the document version information from the document version images transmitted by the image capture device,
compare at least some of the document version information decoded from the received document version images to the respective stored document version information associated with the document; and
the document management server is further functional to automatically generate and transmit a mismatch signal via the communications network to the user communications device if at least some of the decoded document version information for a respective one of the documents does not match the stored document version information for that document.

13. The system of claim 12 wherein:
the stored document version information comprises a current document revision identifier and the encoded document version information comprises an encoded document revision identifier; and
the document management server is further functional to automatically transmit the mismatch signal if the decoded document revision identifier for a respective one of the documents does not match the current document revision identifier stored for that document.

14. The system of claim 13 wherein:
the document version information stored in the document management database further comprises jurisdictional data defining a jurisdictional region corresponding to a document regulatory authority associated with each of the documents;
the user communications device further comprises a global positioning system (GPS) receiver functional to detect and generate current document location coordinates defining the locations where the documents are scanned;
the user communications device is further functional to transmit the current document location coordinates to the document management server via the data communications network; and
the document management server is further functional to receive the current document location coordinates,
compare the current document location coordinates to the stored jurisdictional data associated with the documents, and
automatically transmit the mismatch signal if the current document location coordinates received for a respective one of the documents define a location that is outside the jurisdictional region associated with that document.

15. The system of claim 14 further comprising a portable wireless communications device and wherein the image capture device and the user communications device are integral to the portable wireless communications device.

16. The system of claim 15 wherein:
the portable wireless communications device is a user cellular telephone configured to receive voice and text messages directed to a user cellular telephone number;
the image capture device is a camera embedded in the user cellular telephone;
the data communications network is a cellular communications network; and
the mismatch signals comprise at least one of a text message, voice message, and email message directed to the user cellular telephone.

17. The system of claim 16 wherein the user cellular telephone is functional to generate at least one of a visual alert or an audible alert in response to receiving the mismatch signals.

18. A method of managing construction documents used on different on construction project sites comprising:
storing digital copies of current and historical versions of construction documents in a central document management server;
storing in the central document server a unique document version identifier for each historical and current version of each document;
storing in the central document server a regulatory jurisdiction identifier for each document;
storing in the central document server contact information for a notification person for each document;
connecting the central document server to a data network so that the document management server can be accessed at a server access address;
printing one or more of the documents as a paper document for use at a construction project site, wherein the step of printing the paper document further comprises
generating a matrix barcode for the document being printed,
encoding the matrix barcode with the document version identifier, and
printing the encoded matrix barcode on the paper document;
receiving via the data network at the central document server a document version identifier decoded from a matrix barcode printed on a paper document at one of the project sites;
in a version comparison step performed by the central document server, comparing the received document version identifier decoded from the matrix barcode to the document version identifier stored in the central document server that corresponds to the current version of the document; and
automatically communicating via an alert network a result of the version comparison step to a user of the printed document.

19. The method of claim 18 further comprising:
storing in the central document server a regulatory jurisdiction location for each document;
receiving at the central document server via one of either the data network or the alert network location data representing a geographic location of the project site where the paper document is located;
in a jurisdiction verification step performed by the central document server, comparing the geographic location of the project site for the scanned matrix car code to the regulatory jurisdiction location stored for the document; and
automatically communicating via the alert network a result of the jurisdiction verification step to a user of the printed document.

20. The method of claim 19 wherein:
the data network comprises a cellular network;
the alert network comprises a cellular network;
the method further comprises scanning the matrix barcode on the printed document at the project site using a portable wireless device coupled to the cellular network;
the location data received by the central document server is generated from a Global Positioning Receiver located in the portable wireless device; and
the results of the version comparison and jurisdiction verification steps are communicated to the portable wireless device.

* * * * *